United States Patent
Al-Azzawe et al.

(10) Patent No.: US 7,203,927 B2
(45) Date of Patent: Apr. 10, 2007

(54) SQL DEBUGGING USING XML DATAFLOWS

(75) Inventors: Abdul Hamid Al-Azzawe, San Jose, CA (US); Constance Jane Nelin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 09/957,795

(22) Filed: Sep. 20, 2001

(65) Prior Publication Data

US 2003/0056198 A1 Mar. 20, 2003

(51) Int. Cl.
*G06F 9/44* (2006.01)
*G06F 7/00* (2006.01)
*G06F 17/30* (2006.01)

(52) U.S. Cl. .................................. 717/124; 707/10

(58) Field of Classification Search ........ 717/124–129, 717/131; 715/513; 714/45; 707/1–5, 10
See application file for complete search history.

(56) References Cited

U.S. PATENT DOCUMENTS

| | | | |
|---|---|---|---|
| 5,815,653 A | 9/1998 | You et al. | 395/183.14 |
| 6,058,393 A | 5/2000 | Meier et al. | 707/10 |
| 6,061,517 A | 5/2000 | House et al. | 395/704 |
| 6,381,635 B1* | 4/2002 | Hoyer et al. | 709/207 |
| 6,578,192 B1* | 6/2003 | Boehme et al. | 717/115 |
| 6,697,964 B1* | 2/2004 | Dodrill et al. | 714/38 |
| 6,718,516 B1* | 4/2004 | Claussen et al. | 715/513 |
| 6,732,330 B1* | 5/2004 | Claussen et al. | 715/513 |
| 6,748,583 B2* | 6/2004 | Aizenbud-Reshef et al. | 717/127 |
| 6,754,847 B2* | 6/2004 | Dalal et al. | 714/27 |
| 6,792,466 B1* | 9/2004 | Saulpaugh et al. | 709/229 |
| 6,954,751 B2* | 10/2005 | Christfort et al. | 707/6 |
| 6,961,924 B2* | 11/2005 | Bates et al. | 717/125 |
| 2002/0169860 A1* | 11/2002 | Duggan et al. | 709/223 |

FOREIGN PATENT DOCUMENTS

CA 2205096 11/1998

OTHER PUBLICATIONS

Rolince et al. BSML: An Application of XML to Enhance Boundary Scan Test Data Transportability. IEEE. 2001. pp. 83-91.*
Chiu. A Script Language for Generating Internet-bots. IEEE. 2001. pp. 667-671.*
Gomaa, Hassan; Menasce, Daniel A; "Design and Performance Modeling of Component Interconncetion Patterns for Distributed Software Architectures", p. 117-126, ACM 2000, retrieved Jan. 4, 2006.*

* cited by examiner

*Primary Examiner*—Mary J. Steelman
(74) *Attorney, Agent, or Firm*—Sandra M. Parker, Esq

(57) ABSTRACT

A method, apparatus and article of manufacture is provided for debugging within a computer system network. The method uses XML dataflows from/to a console for debugging of instructions located in a server, which has a database management system for retrieving data from a database stored in an electronic storage device coupled to the server. The method uses a debugger manager at the console for commanding and monitoring debugging operations of the server-side instructions, performed by a debugger engine, and uses XML command and status report dataflows for providing a database communication interface between the debugger manager and the debugger engine. Some preferred embodiments use stored procedures in addition to the XML dataflows, and the debugger manager executes in a multi-threaded environment.

39 Claims, 5 Drawing Sheets

SQL DEBUGGING USING XML DATAFLOWS

RELATED APPLICATION

The present invention is related to a co-pending application entitled: "SQL Debugging Using Stored Procedures", Ser. No. 09/957,970, filed concurrently, assigned to the assignee of the present invention and fully incorporated herein by reference.

BACKGROUND OF THE INVENTION

1. Field of the Invention

This invention relates in general to database management systems performed by computers, and in particular to an optimized remote computer system database debugging, monitoring and managing technique useable in a client-server computing environment.

2. Description of Related Art

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

Recently, Persistent SQL Modules (PSM) language became a standard language for coding SQL-based logic, such as stored procedures, user defined functions (UDFs) and triggers. PSM is very similar to Microsoft SQL Server's TSQL and Oracle PL/SQL, which are proprietary technologies and thus not standard. PSM allows for the development of DB2 stored procedures using the SQL language.

As with any development language, there exists a need to provide an efficient mechanism for debugging routines coded in SQL language, and especially for debugging stored procedures with SQL instructions. A new PSM Debugger product by IBM Corporation will soon be implemented in DB2's latest addition to the application development tool suite. It is disclosed in a co-pending application "SQL Debugging Using Stored Procedures", incorporated herein by reference, by the same inventor, assigned to the assignee of the present invention, and filed concurrently. The debugger gives a user the ability to perform source-level debugging of PSM code. The DB2 Stored Procedure Builder will also be provided, which includes a client front-end to the PSM Debugger, allowing the user to remotely debug server-side SQL stored procedures and other resources.

The PSM Debugger has a PSM Debugger server-side component and a PSM Debugger client-side component. The PSM Debugger server-side component is the back-end interface of the debugger, which forwards the debugging session execution states to the debugger front-end client-side component, including a user interface, and responds to the commands that are issued from this client-side component. The user interface is used to display the debugging session states, including all of the debugger views (such as, source code, variables, call stack, and break points), received from the server-side component, and to forward user commands to the debugger back-end component. The client-side component and server-side component communicate with each other in the PSM Debugger using a set of debugger router stored procedures.

As with any debugger framework, regardless of the language it is used for, there is a need to communicate user interface commands, as well as the debugging session states, between the debugger client component and the debugger server component in a most efficient manner. It is desirable to make the server component implementation independent of the client component implementation. It is also desirable to simplify the PSM debugger router which presently uses stored procedures, required to communicate the various user debugger commands and the debugging session states.

While there have been various techniques developed for optimizing the remote systems debugging and management functions, there is still a need in the art for further optimization techniques involving remote systems debugging operations. Therefore, it would be advantageous to provide a computer method that efficiently debugs and controls the target computer site, is easy to implement and maintain, and decreases the use of communication resources between processors.

SUMMARY OF THE INVENTION

The foregoing and other objects, features, and advantages of the present invention will be apparent from the following detailed description of the preferred embodiments, which makes reference to several drawing figures.

One preferred embodiment of the present invention is a method which uses XML dataflows from/to a console for debugging of instructions located in a server. The server has a database management system for retrieving data from a database stored in an electronic storage device coupled to the server. The method uses a debugger manager at the console for commanding and monitoring debugging operations of the server-side instructions, performed by a debugger engine, and uses XML command and status report dataflows for providing a database communication interface between the debugger manager and the debugger engine. Other method preferred embodiments use stored procedures in addition to the XML dataflows, and the debugger manager executes in a multi-threaded environment.

Other preferred embodiments of the present invention are apparati implementing the above-mentioned method embodiments of the present invention.

Yet other preferred embodiments of the present invention include program storage devices readable by a computer tangibly embodying programs of instructions executable by the computer to perform method steps of the above-mentioned method embodiments of the present invention.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings, which form the part thereof, and in which are shown by way of illustration specific embodiments in which the invention may be practiced. It is to be understood that other embodiments may be utilized and structural and functional changes may be made without departing from the scope of the present invention.

The present invention discloses a system, method and program storage device embodying a program of instructions executable by a computer to perform the method of the present invention using Extensible Markup Language (XML) dataflows for debugging, monitoring and managing execution of SQL stored procedures and other relational database server resources in a computer network. The method and system are preferably used in a distributed computing environment in which two or more computer systems are connected by a network, including environments in which the networked computers are of different types. At least one database manager software system is installed on and runs on the networked server computer system. A network client computer system acts as the console for debugging, monitoring and managing resources present on a server computer system in the network. The XML dataflows are used as the communication mechanism between the debugger server and the debugger client, in order to simplify the communication procedure and make the server component implementation independent of the client component implementation.

Figure 1:
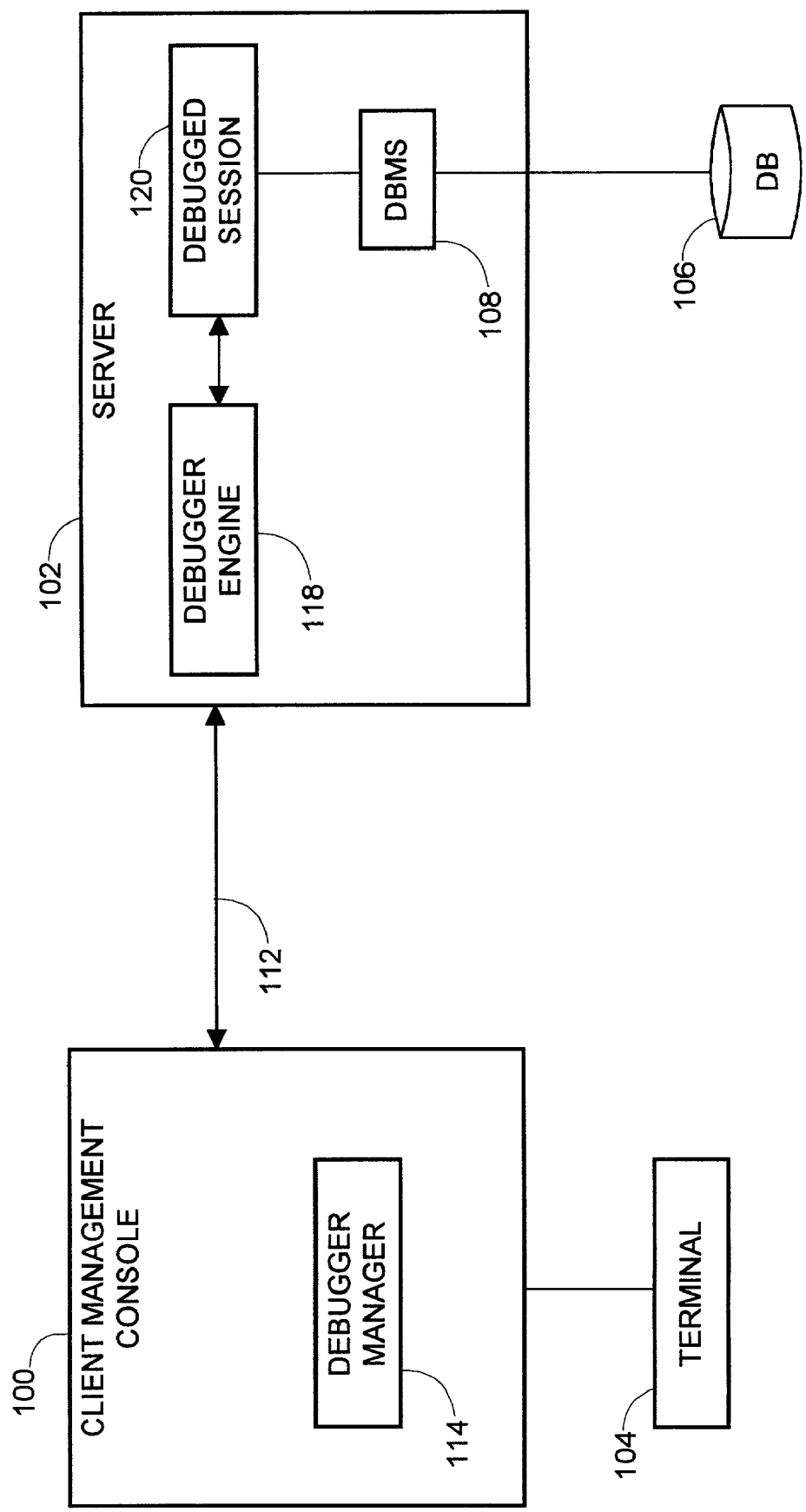
FIG. 1 illustrates a computer hardware and software environment enabling SQL debugging operation using XML dataflows, according to some preferred embodiments of the present invention.

FIG. 1 illustrates an exemplary computer hardware and software environment useable by the preferred embodiments of the present invention, including a client management console 100 and a database server 102, each having one or more conventional processors (not shown) executing instructions stored in an associated computer memory (not shown). The operating memory can be loaded with instructions received through an optional storage drive or through an interface with the network. The preferred embodiments of the present invention are especially advantageous when used in a network environment, having a console terminal 104 on the console 100 site, with the console 100 site processor networked to the server 102 site processor.

The database server 102 site processor is connected to one or more electronic storage devices 106, such as disk drives, that store one or more relational databases. Storage devices may also be used on the console 100 site. They may comprise, for example, optical disk drives, magnetic tapes and/or semiconductor memory. Each storage device permits receipt of a program storage device, such as a magnetic media diskette, magnetic tape, optical disk, semiconductor memory and other machine-readable storage device, and allows for method program steps recorded on the program storage device to be read and transferred into the computer memory. The recorded program instructions may include the code for the method embodiment of the present invention. Alternatively, the program steps can be received into the operating memory from a computer over the network.

Operators of the console terminal 104 use a standard operator terminal interface (not shown), such as IMS/DB/DC, CICS, TSO, OS/2 or other similar interface, to transmit electrical signals to and from the console 100, that represent commands for performing various debugging, as well as search and retrieval functions, termed queries, against the databases stored on the electronic storage device 106. In the present invention, these queries conform to the Structured Query Language (SQL) standard, and invoke functions performed by a DataBase Management System (DBMS) 108 located at the server 102 site, such as a Relational DataBase Management System (RDBMS) software. In the preferred embodiments of the present invention, the RDBMS software is the DB2 product, offered by IBM for the AS400, OS390 or OS/2 operating systems, the Microsoft Windows operating systems, or any of the UNIX-based operating systems supported by the DB2. Those skilled in the art will recognize, however, that the present invention has application to any RDBMS software that uses SQL, and may similarly be applied to non-SQL queries.

FIG. 1 further illustrates a software environment enabling preferred embodiments of the present invention useable for debugging of server code. In the system shown in FIG. 1, the client management console 100 further includes a debugger manager 114 software with a user's interface (UI) of the present invention, capable of communicating with the database server 102 via a standard, preferably only one, hardware database connection communication line 112, to invoke loading and running of a debugger session with SQL code on the database server 102. The hardware database connection communication line 112 is preferably the same standard hardware DB2 communication connection between the server site and client site, and the present invention does not require use of a separate connection and a private communication protocol and data exchange mechanism.

The server 102 has a debugger engine 118 which runs a debugged session 120 on the database server 102, to execute and debug SQL instructions. A session is a process (thread) executing the application software, which may include SQL stored procedures, user defined functions (UDFs) and triggers. The debugger engine 118 is also connected with the DBMS 108 and has access to the database items. It returns the debugging results back to the client console 100, using the same hardware database connection communication line 112.

After the loading of the SQL code into the server 102, the debugging is commanded and monitored from the console 100 via the debugger manager 114 software, which communicates with the debugger engine 118 through the database connection communication line 112. The commands include requests to initialize or terminate session, and to send to and receive data from the debugger engine 118. When the debugging and managing commands are on the server 102 site received by the debugger engine 118, to initiate or perform the debugging of the debugged session 120, the debugger engine 118 performs according to the request sent from the client management console 100, and returns the requested information to the debugger manager 114 at the console 100 site.

In the preferred embodiments of the present invention, the described methods enable client-side debugging of server-side SQL instructions in a step-by-step debugging mode, by interruption of each executed instruction of a session running on a database server, from a remote client location debugger UI manager, attached to the database server via a database communication line that is used to route debugger data and commands. Although shown in regard to PSM SQL stored procedures, the present invention can also be used in a similar way for SQL UDFs and SQL triggers, as both of these use PSM and are compiled in the same manner. While the preferred embodiments of the present invention are preferably debuggers for PSM SQL, the present invention is not limited to SQL instructions, but can be used for any client-server database manager debugging operation, where the debugging session is invoked from a remote location, SQL or otherwise, such as for debugging PL/SQL or TSQL instructions.

The preferred embodiments of the present invention format the data exchanged between the client debugger manager 114 and the server debugger engine 118, and utilize XML as the data formatting mechanism. Use of XML as the data formatting mechanism allows the exchange of complex data, while allowing the debugger client-server data exchange interface to be simple, extensible, and flexible. In the present invention the debugger components communicate between the client console 100 and database server 102 using two dataflows: a Server Report dataflow and a Client Command dataflow. The Client Command dataflow is used to route debugging commands and data to the debugger engine 118. The Server Report dataflow is used to retrieve the status of the data obtained during the debugging operation. Each of these dataflows uses two streams of data, an XML document stream with textual data, and a binary stream with binary data.

The present invention needs two streams of data because a single stream of textual XML data cannot completely describe the mixture of textual and binary data. Binary data are required to detail the value of Binary Large Object (BLOB) and For Bit Data character array SQL types. To address this problem, the debugger of present invention uses two streams of data that are sent back and forth between the debugger manager and the debugger engine: an XML textual stream and a binary data stream. The XML textual stream contains all of the standard textual data, including textual SQL data type values. The XML textual stream also describes the length and offset of any binary SQL data type value contained in the binary stream. Multiple binary variables can be detailed in the same binary stream, as required.

The following is an example of an XML textual stream and a binary data stream pair:
XML Textual Stream:
<!DOCTYPE PSMDReport>
<PSMDReport>
<RoutineUpdates rid="SQL010416103756800">
<LargeBitVarDefine line="13" name="VEMPPHOTO" type="10" size="262144" tvid="4"/>
<LargeBitVarValue vid="4" offset="0" boffset="0" bsize="80"/>
</RoutineUpdates>
<AtBreakPt rid="SQL010416103756800" state="00000" code="0" bid="0">55</AtBreakPt>
</PSMDReport>
  Binary Data Stream:
  0000: 00 1F 12 45 66 88 99 11
. . .
  0048: 3A 76 66 25 8B 3C 1D EF In the present invention, since the XML dataflows act as message routers between the debugger engine 118 and the debugger manager 114, this enables the client to perform the debugging of the server-side SQL instructions using the same standard hardware DB2 communication connection between the server site and client site, and does not require use of a separate connection and a private communication protocol and data exchange mechanism. Using the dataflows greatly simplifies the communication mechanism required between the client console 100 and the server 102, and provides a standard, well-known database communication interface for exchanging data between the debugger manager 114 and debugger engine 118.

The mechanism for exchange of communication debugging commands and data between the debugger engine 118 and the debugger manager 114 via the XML dataflows, according to the preferred embodiments of the present invention, simplifies the communication protocol and content of messages sent back and forth, and eliminates the need for complex data formats and interfaces. As mentioned above, there are two types of data that must be exchanged between the debugger engine and the debugger manager: debugging commands sent from the debugger manager to the debugger engine to control and monitor the execution of the stored procedures being debugged, and status reports sent from the debugger engine to the debugger manager reporting the status of the stored procedures being debugged.

In order to simplify and separate the implementation of the client-side and server-side components, the present invention defines the content of the communication messages in a way that may be easily understood outside the realm of the proprietary DB2 engine implementation, and provides an open interface that insulates the implementation of the debugger manager of the present invention from the debugger engine implementation. This is achieved through the use of well defined textual and binary data streams, that define the content of the debugging command messages and the status report messages. This makes it possible to provide the separation between the debugger manager design and the debugger engine design, and at the same time builds an open foundation where third party tool providers may choose to provide their own debugger manager user interface that is tightly integrated into their own tools, meeting their specific design goals.

Debuggers, regardless of language they are used with, provide a standard set of debugging commands to control the execution of the routine being debugged. Listed bellow are some of these standard debugging commands, including some SQL specific extensions, that are supported by the debugger of the present invention, which are capable of providing call-stack tracking, line-by-line execution status reporting, line breakpoints management, variable change breakpoints management, and variable value reporting and modification capabilities. The debugger of the present invention is able to support at least the following debugging commands, sent to the debugger engine managing the debugger session being debugged from the debugger manager via the Client Command dataflow. The debugger manager sends user requests and commands in the form of a Client Command XML document, with accompanying binary stream, as required. The Client Command XML document can contain as many XML command-tags as required to relate a set of user commands. An exemplary set of Client Command XML tags useable in the present invention is presented below in Appendix B.

Debuggers, regardless of language, also provide a standard set of debugging reports to show the status of the routine being debugged. Listed bellow are some of these reports that are supported by standard debuggers, including some SQL specific extensions, that are also supported by the debugger of the present invention. The debugger of the present invention is able to support at least the following debug reports sent by the debugger engine managing the debugger session being debugged and retrieved by the debugger manager via the Server Report dataflow. The debugger engine sends the current status of the session code being debugged in the form of a Server Report XML document, with its accompanying binary stream, as required. The Server Report XML document can contain as many XML report-tags as required to completely describe the changing status of the debugged session code. An exemplary set of Server Report XML tags useable in the present invention is presented below in Appendix C.

Conventional debuggers use proprietary APIs or data exchange formats that cannot be easily deciphered to allow for replacement of the debugger manager user interface by third party tool developers. Since the preferred embodiments of the present invention use a pair of textual and binary data streams to exchange the above-mentioned commands and status reports, this allows for the transmitted data to be specified in a non-proprietary way, that can be easily understood outside of DB2 environment. Using a well-defined textual and binary data protocol between the debugger manager and the debugger engine, and formatting these data using standard XML dataflows makes it possible for these third party tool developers to implement their own unique debugger tools that integrate tightly into their development products.

The debugger of the present invention is included in the DB2 UDB version V7.2, providing PSM debugging support for UNIX, Windows and other platform support. It will preferably be used for developing applications for DB2 servers in SQL PSM language, using stored procedures, UDF and triggers. The present invention works with any of the IBM database manager products, such as DB2 for VM/VSE, DB2 for OS/390, DB2 for AS/400, DB2 Common Server, DB2 Universal Database. However, the technology may be applied to any other database manager products, such as Oracle, Informix, Sybase, SQL Anywhere, and Microsoft SQL Server, and other relational and non-relational products.

The present invention allows for rapid and timely remote site software debugging, and minimizes the load on the network to initialize and maintain the remote site debugging operation. It may be applied to multivendor sources and targets, including Oracle, Sybase, Informix, Microsoft SQL Server, and others. It may be used with multidatabase servers that provide a single-site image to all data, relational and non-relational, local and remote, from IBM and non-IBM platforms, as though the data were local, regardless of the differences in SQL dialects, data access methods, networking protocols, and operating systems, in truly heterogeneous environments.

One implementation of the present invention is presented in preferred embodiments of the present invention illustrated in FIGS. 1–6. It includes a system, a method and program storage device embodying a program of instructions executable by a computer for debugging, monitoring and managing execution of SQL stored procedures and other relational database server resources in a computer network, using stored procedures in addition to the XML dataflows. The method and system are preferably used in a distributed computing environment in which two or more computer systems are connected by a network, including environments in which the networked computers are of different types. At least one database manager software system is installed on and runs on the networked server computer system. A network client computer system acts as the console for debugging, monitoring and managing resources present on a server computer system in the network. The XML dataflows are used as the communication mechanism between the debugger server and the debugger client, in order to simplify the communication procedure and make the server component implementation independent of the client component implementation.

One version of this implementation is included in the IBM product DB2 PSM Debugger which is a part of the application development tool suite, such as the DB2 Stored Procedure Builder. The PSM debugger gives users the ability to perform source-level debugging of PSM (Persistent SQL Modules) code. The DB2 Stored Procedure Builder includes a client front-end to the PSM Debugger, allowing remote debugging of the server-side SQL instructions, including stored procedures, UDFs, and triggers. This implementation is specifically designed to work with the DB2 SQL Debugger Server interface. It relies on using debugger router stored procedures to communicate with the back-end of the debugger and uses XML dataflows as the communication framework.

The same FIG. 1 can be used to illustrate an exemplary computer hardware and software environment useable by the preferred embodiments of this implementation of the present invention. It includes a client management console 100 and a database server 102, as described above regarding the generic preferred embodiments of the present inventions. FIG. 1 further illustrates a software environment enabling preferred embodiments of the present invention useable for debugging of server 102 code. In the system shown in FIG. 1, the client management console 100 further includes a debugger manager 114 software with a user's interface (UI) of the present invention, capable of communicating with the database server 102 via a standard, preferably only one, database connection communication line 112, to invoke loading and running of a debugger session with SQL code on the database server 102. The server 102 has a debugger engine 118 which runs a debugged session 120 on the database server 102, to execute and debug SQL instructions. The debugger engine 118 is also connected with the DBMS 108 and has access to the database items. It returns the debugging results back to the client console 100, using the same database connection communication line 112.

After the loading of the SQL code into the server 102, the debugging is commanded and monitored from the console 100 via the debugger manager 114 software, which communicates with the debugger engine 118 through the database connection communication line 112. The commands include requests to initialize or terminate session, and to send to and receive data from the debugger engine 118. When the debugging and managing commands are on the server 102 site received by the debugger engine 118, to initiate or perform the debugging of the debugged session 120, the debugger engine 118 performs according to the request sent from the client management console 100, and returns the requested information to the debugger manager 114 at the console 100 site.

In the preferred embodiments of the present invention, the described methods enable client-side debugging of server-side SQL instructions in a step-by-step debugging mode using debugger hooks, by interruption of each executed instruction of the session 120 running on the database server 102, from the remote client location debugger manager 114, attached to the database server 102 via the database communication line 112 that is used to route debugger data and commands. Although shown in regard to PSM SQL stored procedures, which may be used for managing server network resources, the present invention can also be used in a similar way for SQL UDFs and SQL triggers, as both of these use PSM and are compiled in the same manner. While the preferred embodiments of the present invention are preferably debuggers for PSM SQL, the present invention is not limited to PSM or SQL instructions, but can be used for any client-server database manager debugging operation, where the debugging session is invoked from a remote location, such as for debugging PL/SQL or TSQL instructions.

FIG. 1 illustrates two major software components, according to the preferred embodiments of this implementation of the present invention. The debugger engine 118 is the back-end interface of the debugger. It forwards a server-side debugged session 120 execution state to the debugger front-end debugger manager 114 user interface module and responds to the commands that it issues to the debugger engine 118. The debugger manager 114 user interface module presents on the terminal 104 the debugged session 120 execution state, including all of the debugger views, such as debugged source code, variables, call stack, and breakpoints, and it forwards user commands to the debugger engine 118.

In this implementation of the present invention the debugger engine 118 and the debugger manager 114 component communicate with each other using a set of stored procedures. The debugger engine 118 component uses a server interface and XML data streams for the server side interactions with the debugger manager 114 for remote debugging of the debugged session 120 code. The debugger engine 118 interface includes a debugger router 208 with a debugged session management stored procedures 240, both shown in FIG. 2. The debugger router 208 has a set of stored procedures, which are preferably trusted (unfenced) stored procedures, used to initiate and terminate the debugged session 120, as well as to send and receive data during debugging. Unfenced/trusted routines run in the same process as the database engine. Fenced/untrusted routines run in a separate process. One aspect of the debugger router 208 includes at least these stored procedures: psmd_Initialize, psmd_Command, psmd_GetStatus and psmd_Terminate.

Psmd_Initialize initializes a particular debug session 120 using a session identifier. Once initialized, the debugger manager 114 will automatically attach to any PSM server-side code that is compiled in debug mode to include debugging hooks and is executed under a given session identifier. Psmd_Command sends debugger manager 114 commands to the debugger engine 118 using the session identifier. A debugger manager 114 command is a pair of data streams: an XML text stream describing the user commands and any textual data, and a binary data stream for non-textual data. Psmd_GetStatus receives debugger engine 118 reports using a given session identifier. A debugger server report is a pair of data streams: an XML text stream describing the server 102 status and any textual data, and a binary data stream for non-textual data. Psmd_Terminate terminates the debugged session 120 using a given session identifier.

The debugged session management stored procedures 240 are used to specify and lookup the debugged session 120 identifier, as well as to cleanup the debugged session 120 resources. There may be trusted (unfenced) and non-trusted (fenced) versions of these stored procedures. The trusted version should be used when debugging trusted stored procedures, and the non-trusted version should be used when debugging non-trusted stored procedures. The debugged session identifier is required by the debugger in order to attach to the database server 102 connection and debug the code being executed.

The debugged session management stored procedures 240 for PSM SQL include: psmd_SetSessionId, psmd_GetSessionId, and psmd_CleanupSession. The exact definition or declaration of these stored procedures is shown in Appendix A below. psmd_SetSessionId must be called by the debugger manager 114 prior to debugging and execution of the server-side PSM code, to set the database connection debugged session 120 identifier. One way to generate a unique session identifier is to use a random number generator based on the current time in milliseconds. psmd_GetSessionId looks up the current database connection debugged session 120 identifier. psmd_CleanupSession cleans up any outstanding debugged session 120 resources for the current database connection. This API is only required in abnormal termination cases, as session resources are automatically released when the debugged session 120 terminates.

In addition to the debugger server 102 interfaces, the present invention includes a set of utility stored procedures that can be used to build the stored procedures in both debug mode and release mode, and create the stored procedure source code useable for debugged session 120. The exact definition of one of these stored procedure db2udp!compile_for_debug is shown at the end of Appendix A below.

In the present invention the data exchanged between the client management console 100 and the server 102 utilize XML as the data formatting mechanism. XML allows the debugger data interface to be extensible and flexible, and it helps reduce the actual number of stored procedures required for the debugger server interface. The debugger communicates using two XML dataflows: a server report dataflow and a client commands dataflow. Each of these dataflows uses two streams of data, an XML document stream with textual data, and a binary stream with binary data.

The client commands dataflow is used by the client management console 100 to send user requests and commands in the form of a PSMDCommands XML document stream with its accompanying binary stream. The client PSMDCommands document can contain as many XML command tags as required to relate a set of user commands. Appendix B illustrates various exemplary PSMDCommands XML tags. The server report dataflow is used by the server 102 to send the current status of the code being debugged, such as PSM code, in the form of a PSMDReport XML document stream with its accompanying binary stream. The server PSMDReport document can contain as many XNL report tags as required to completely describe the incremental status of the PSM code. Appendix C illustrates various exemplary PSMReport XML tags.

As described previously, the present invention uses two streams of data, because a single stream of textual XML data cannot completely describe the mixture of textual and binary data, and since binary data are required to detail the value of BLOB (Binary Large Object) and For Bit Data character array SQL types. The XML textual stream contains all of the standard textual data, including textual SQL data type values. The XML stream also describes the length and offset of any binary SQL data type values contained in the binary stream. Multiple binary variables can also be detailed, as required, in the same binary stream.

Figure 2:
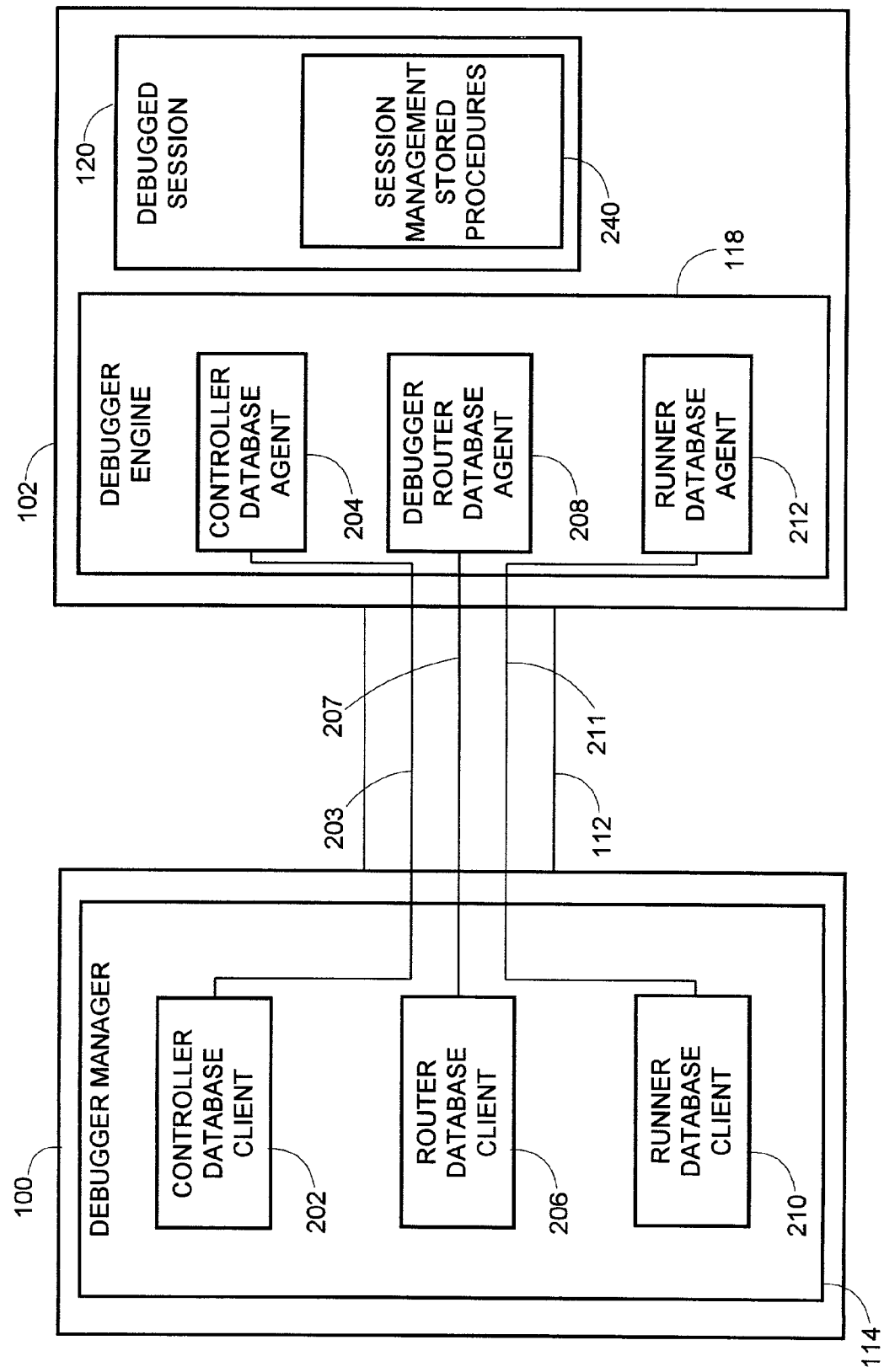
FIG. 2 illustrates a computer hardware and software environment enabling SQL debugging operation using stored procedures and XML dataflows, according to other preferred embodiments of the present invention.

The debugger engine 118 and the debugger manager 114 with a user interface each have several components illustrated in FIGS. 2–5 using block diagrams and flowcharts, and pseudocode shown in Appendices B, C. As shown in FIG. 2, a controller database agent 204 is located in the server debugger engine 118 and together with a controller database client 202, located in the client debugger manager 114, it is responsible for servicing a controller client software connection 203. The controller database agent 204 is used to execute such commands sent from the controller database client 202 as: stored procedure source lookup, enumeration of server stored procedures, creation and building of stored procedures, as well as dropping (deleting) unwanted stored procedures. Therefore, the controller database agent 204 is used to provide standard database utility functions, independent from debugging session, at the server 102 site.

A debugger router database agent 208 is located in the server debugger engine 118 and together with a router database client 206, located in the client debugger manager 114, it is responsible for servicing a router client software connection 207 and is used to invoke the router stored procedures that initiate and terminate a debugged session, as well as to send and receive debug data. A runner database agent 212 is located in the server debugger engine 118 and together with a runner database client 210, located in the client console debugger manager 114, it is responsible for servicing a runner client software connection 211 and is used to invoke the session management stored procedures 240 that manage the debugged session 120 identifier and resources, as well as to invoke the actual stored procedure being debugged.

The preferred embodiments of the present invention use a multi-threaded environment in the client management console 100, although a single threaded implementation is also possible. With use of multiple threads a more flexible framework can be achieved. In a multi-threaded environment the debugger manager 114 requires execution of the following three threads: cliController, cliRouter and cliRunner thread. cliController is the controller thread which handles the debugger manager 114 graphical user interface commands, i.e., all of the debugger user's actions. This is typically the main user interface thread, and for Java this would be the swing thread. cliRouter is the router thread which routes all of the user-initiated debugger commands to the debugger, and it receives and processes all of the debugger messages. cliRunner is the runner thread which calls the server 102 side code that is to be debugged, such as a SQL stored procedure, and captures any SQL exceptions or error codes.

The three database software connections: the controller client software connection 203 (conController), router client software connection 207 (conRouter), and runner client software connection 211(conRunner) are all used to transfer data through the database connection communication line 112. They are required to execute the remote debugger engine 118 code and to control the execution of that remote code, among some other maintenance tasks. conController 203 is used by the controller thread to get the source code to be debugged from the database server 102, issue the build in-debug and in-release mode commands, and enumerate the various server elements, such as the SQL stored procedures. conRouter 207 is used by the router thread to communicate with the debugger engine 118 to invoke various debugger procedures used to initiate or terminate the debugged session 120, and it sends and receives data. conRunner 211 is used by the runner thread to execute the code being debugged by the debugged database engine 118, such as a SQL stored procedure. It is possible to use the same database connection for both the controller and the router threads, with a proper synchronization mechanism to ensure serialized access to the database connection by the two threads.

The debugger of the present invention supports the standard set of debugger execution control commands, which include commands: cmdRun, cmdRunToLine, cmdStepInto, cmdStepOver, cmdStepOut, CmdStepReturn, cmdPause and cmdRunToEnd. cmdRun initiates run in debug mode or resumes debugging if paused or at a breakpoint. If a break is encountered while running, the debugger will pause at the line that caused the break event; else it will run to completion. cmdRunToLine initiates run in debug mode or resumes debugging if paused or at a breakpoint. If a break is encountered while running, the debugger will pause at the line that caused the break event; else it will run to the selected line where possible. cmdStepInto initiates a step to the next line of code and then a pause (break). If the stored procedure is not running in debug mode, then this command is handled like the cmdRun command above. cmdStepOver initiates a step over to the next line of code and then a pause (break), skipping over any lines of code in an inner-nested block, including nested stored procedure calls. If a break is encountered while stepping, the debugger will pause at the line that caused the break event. cmdStepOut initiates a step over to the next outer-nested line of code and then pause. This may cause a return from a nested routine if the current line of code is at the outer-most block. If a break is encountered while stepping, the debugger will pause at the line that caused the break event. cmdStepReturn initiates a step out of the current routine and return back to the calling routine and then a pause, or run to completion if this is the top of the stack. If a break is encountered while stepping, the debugger will pause at the line that caused the break event. cmdPause initiates a pause for the debugger at the next valid line of code. cmdRunToEnd initiates a run the debugger to completion command, without pausing for any breakpoints.

The debugger of the present invention also supports the standard set of debugger execution control breakpoint commands, including: cmdAddBreakPts, cmdEnableBreakPts, cmdDisableBreakPts and cmdDeleteBreakPts. cmdAddBreakPts adds one or more line or variable change breakpoints. cmdEnableBreakPts enables one or more breakpoints. cmdDisableBreakPts disables one or more breakpoints. cmdDeleteBreakPts deletes one or more breakpoints. The debugger of the present invention further supports additional user commands, such as the commands required to query and modify variable values and value ranges for large data types and a debugged session 120 timeout. Appendix B illustrates an exemplary list of supported debugger execution control commands and their XML tags.

Figure 3:
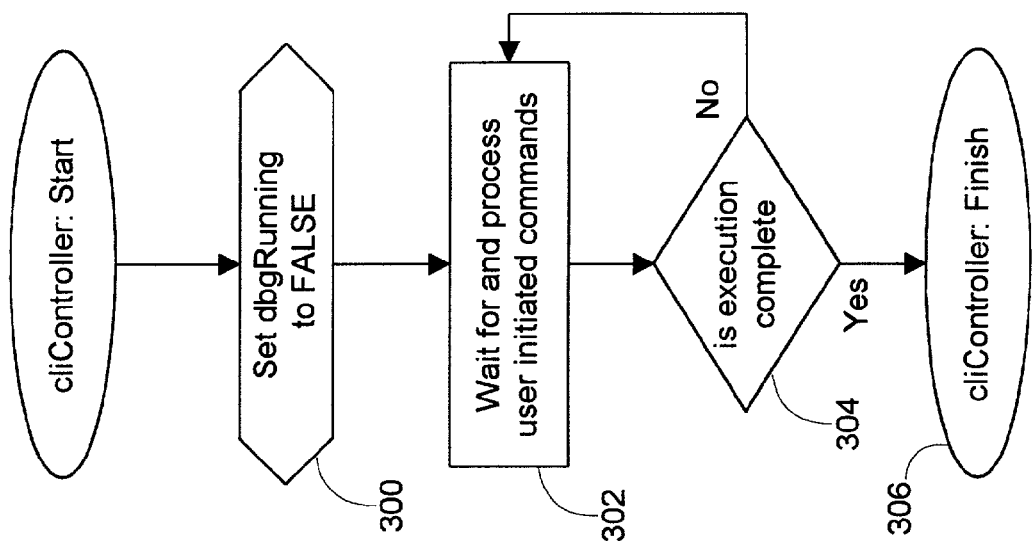
FIG. 3 illustrates a flowchart of the cliController thread, according to some preferred embodiments of the present invention.
Figure 4:
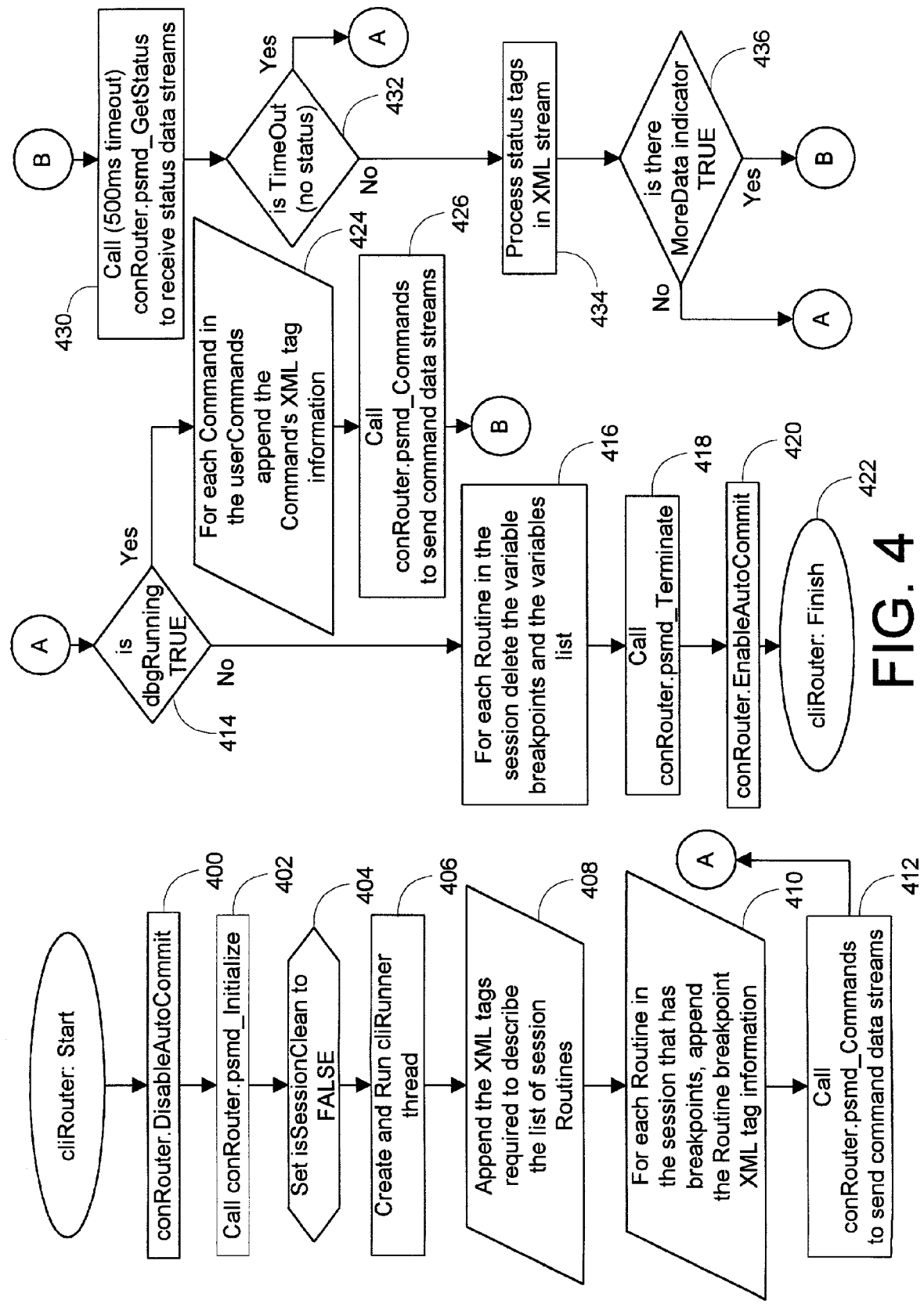
FIG. 4 illustrates a flowchart of the cliRouter thread, according to some preferred embodiments of the present invention.
Figure 5:
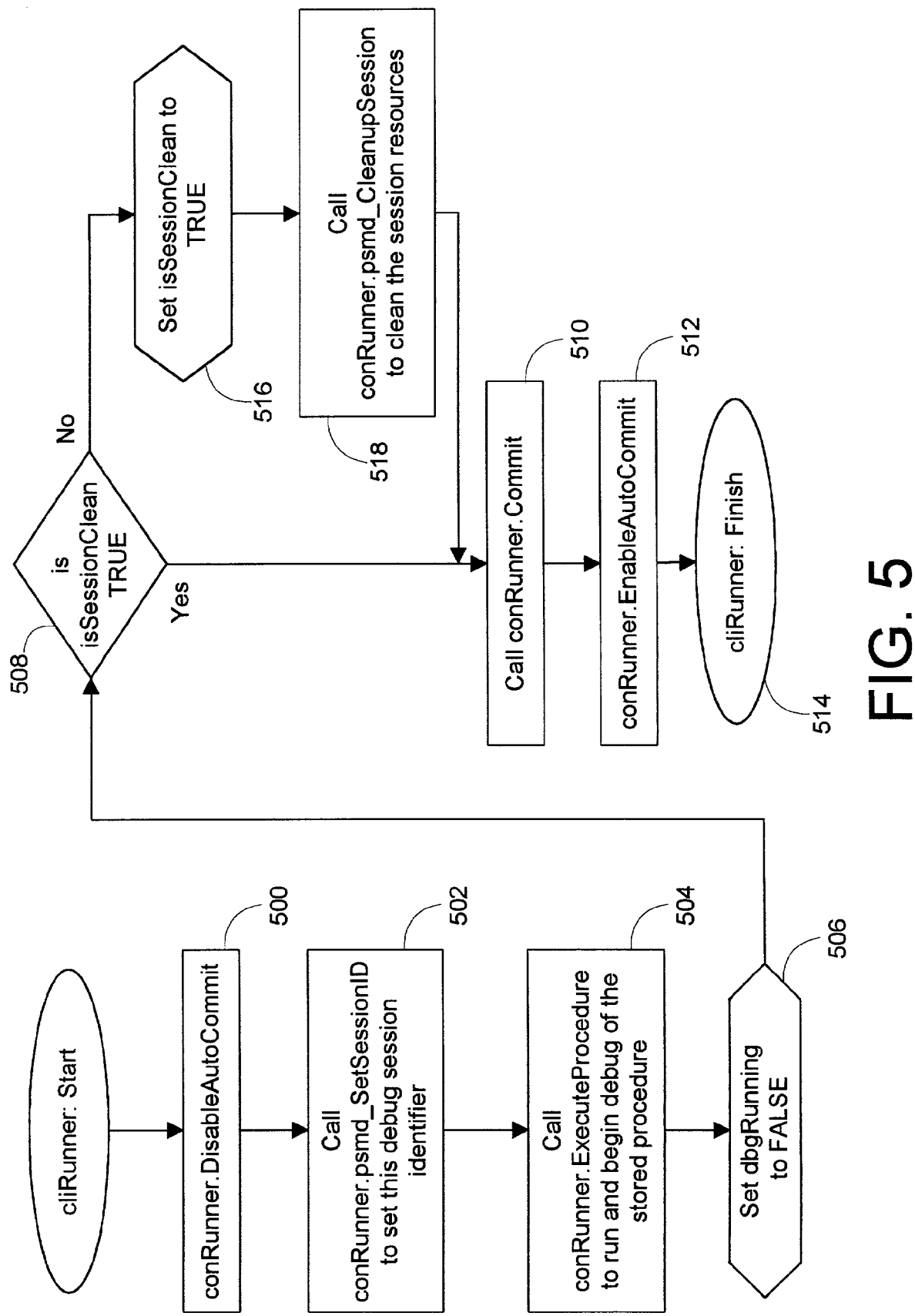
FIG. 5 illustrates a flowchart of the cliRunner thread, according to some preferred embodiments of the present invention.

The execution logic of the debugger manager 114 is illustrated in flowcharts of FIGS. 3–5. FIG. 3 illustrates the execution of the client controller (cliController) thread, FIG. 4 shows the execution of the client router (cliRouter) thread, and FIG. 5 illustrates the execution of the client runner (cliRunner) thread. In FIGS. 3–6 a flag dbgRunning is used to synchronize a status flag to indicate whether the debugged session 120 is in progress or not. Flag IsSessionClean is used to synchronize the status flag to indicate whether the debugged session server resources have been cleaned. Variable userCommands is associated with a FIFO queue and used to synchronize the FIFO queue used to hold a list of user commands to be forwarded to the server-side debugger engine 118 modules. CurRoutine is a name of a variable that holds the name of a routine that is currently in focus. curLine is a name of a variable that holds the current (selected) source line number in the current routine. CurVID is a name of a variable that holds the current (selected) variable identifier in the current routine. LastBID is a name of a variable that holds the current breakpoint number that is used as the next breakpoint identifier.

Figure 6:
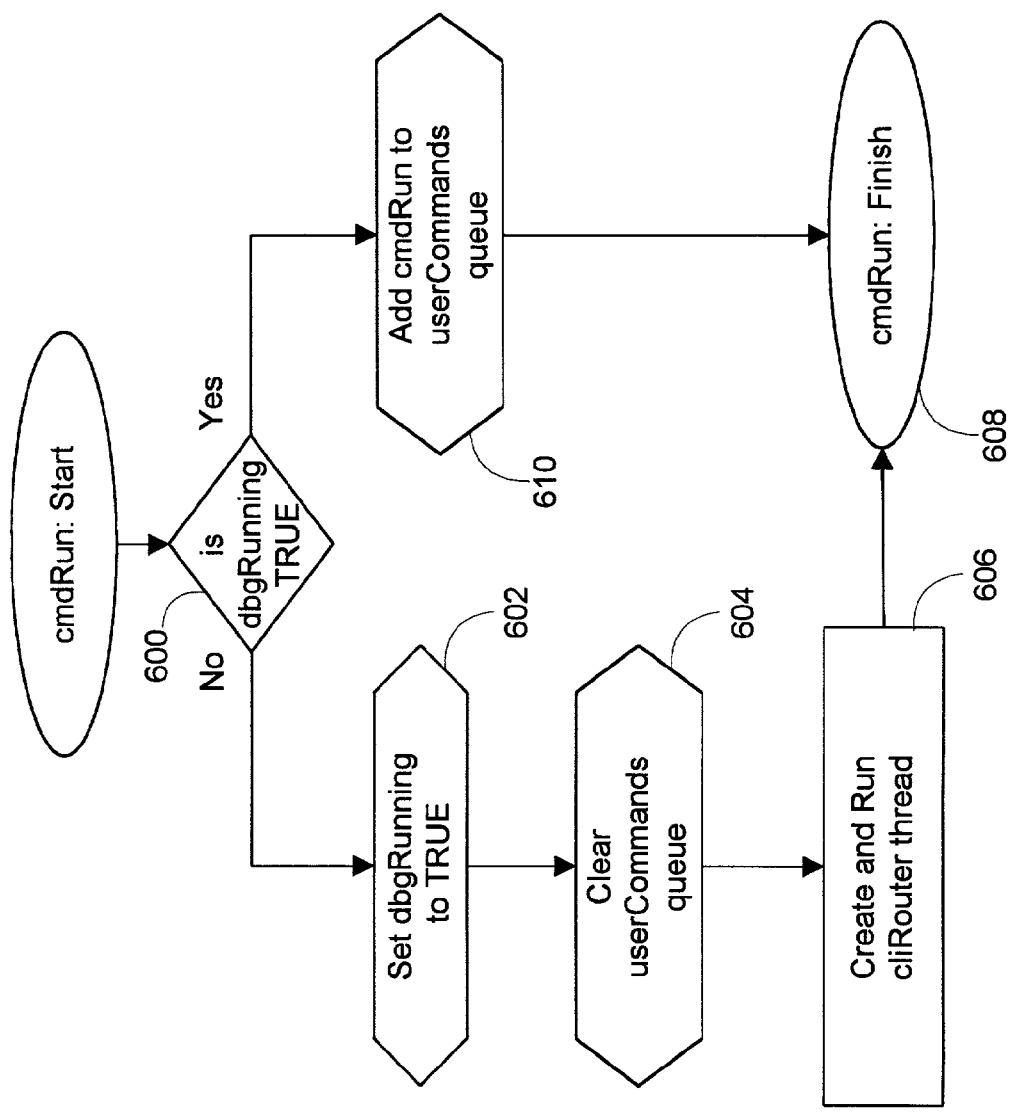
FIG. 6 illustrates a flowchart of the cmdRun routine, according to some preferred embodiments of the present invention.

The logic flow which illustrates the execution of the client controller (cliController) thread is shown in FIG. 3. FIG. 6 illustrates the logic flow of the routine cmdRun, started with the user-initiated debugger Run command. Since it is similar to logic flows of other user-initiated debugger commands, they are not shown. In the first step 300 of the cliController thread illustrated in FIG. 3, the flag dbgRunning is set to False to indicate that debugging has not started yet. In step 302 the thread waits for and then processes user-initiated commands one-by-one, until the execution of the cliController thread is completed, which is detected in step 304. The thread exits in step 306. As shown in FIG. 6, the cmdRun routine first checks in step 600 whether the flag dbgRunnung is True. If not, in step 602 the flag dbgRunnung is set to True, and in step 604 a queue of user commands is cleared, before the debugging starts. Next, in step 606 a cliRouter thread is created and starts running and the cmdRun routine exits in step 608. If the flag dbgRunning was found to be True in step 600, in step 610 the cmdRun command is added to the queue of user's commands, and the routine exits in step 608.

The client router thread cliRouter of these preferred embodiments of the present invention is executed as illustrated in FIG. 4. In order for debugging to take place, AutoCommit is disabled in step 400 and in step 402 the debugger server 102 is initialized by invoking a psmd_Initialize command to debug any server-side SQL code that is executing under a particular session identifier. In step 404 the flag IsSessionClean is set to False. In step 406 the cliRunner thread is created and starts running. The runner client software connection 211, conRunner, is responsible for executing the SQL stored procedure that will be debugged, and needs to set the session identifier. The same session identifier is then used by the router client software connection 207, conRouter, responsible for initiating and terminating the debugged session 120 and sending and receiving the debug data. The stored procedure psmd_SetSessionId is used to set the session identifier for the conRunner connection. The session identifier is then used by the conRouter as an input parameter to the various router stored procedures. In step 408 XML tags are appended, to describe the list of session routines. In step 410 a routine breakpoint XML tag is appended for each routine in the session that has a breakpoint. In step 412 a psmd_Commands is invoked to send the command data streams.

In step 414 it is checked whether the flag dbgRunning is True. If not, in step 416 for each routine in the session all variable breakpoints and variable lists are deleted and in step 418 a psmd_Terminate is invoked to end debugging. AutoCommit is enabled in step 420 and the thread exits in step 422. If in step 414 the flag dbgRunning was found to be True, in step 424 for each command in the user commands queue the thread appends the command XML tag. In step 426 a psmd_Commands is invoked to send the command data streams. Next, step 430 sends a psmd_GetStatus command to receive the status data streams. If no status is received within a timeout value set in step 432, a yes condition, the thread continues in step 414. Otherwise, in step 434 status XML tags are processed. If in step 436 it is found that the indicator for more data is True, the thread continues in step 430. Otherwise, it continues in step 414.

The processing of the status (PSMDReport) XML tags depends on the tag type; they all are used to display on the terminal 104 the current debugging session data. Some of these tags and their processing logic for routines AddRoutines, Call Stack, VarDefine, VarValue, VarVisibility, AtLine, AtBreak, AtBreakPt, AtException, EndRun and EndSession of the present invention are defined herein. AddRoutines is used for each routine defined, if the routine is not loaded and shown on the terminal 104, to load the routine source code using the conController connection. CallStack is used to update the call stack view, for user's review on the terminal 104, with the data including the routine and line number pairs. VarDefine is used to add a new variable entry to the routine's list and variables view. VarValue is used to update the variable value in the routines list and the variables view. VarVisibility is used to update the variable visibility (defined as visible/invisible) in the routines list and the variables view. AtLine is used to set the current line number for the current routine. Routine source view is updated to reflect a new setting, and the routine is marked as running. AtBreak is used to set the current line number for the current routine. Routine source view is updated to reflect a new setting and the routine is marked as paused. This state is typically caused by a stepping user command. AtBreakPt is used to set the current line number for the current routine. Routine source view is updated to reflect a new setting, and the routine is marked as paused. This state is typically caused when reaching a variable/line breakpoint. AtException is used to set the current line number for the current routine. Routine source view is updated to reflect a new setting. Routine is marked as paused. This state is typically caused when entering a SQL exception handler due to some SQL STATE. EndRun is a No-Op showing that the execution of the outer most routine is complete. EndSession is used to set the IsSessionClean status flag to True.

The client runner thread cliRunner of these preferred embodiments of the present invention is executed as illustrated in FIG. 5. In order for debugging to take place, AutoCommit is disabled in step 500. In step 502 a psmd_SetSessionId is invoked to set the debugging session identifier. In step 504 an ExecuteProcedure is run to begin debugging of the stored procedure. In step 506 the flag dbgRunning is set to False when the stored procedure completes execution. In step 508 it is tested whether the flag IsSessionClean is True. If yes, in step 510 the Commit routine is called, in step 512 AutoCommit is enabled and the thread exits in step 514. If the flag IsSessionClean was found to be False, in step 516 the flag IsSessionClean is set to True. In step 518 a psmd_CleanupSession routine is invoked to clean the session resources and the thread continues in step 510.

Appendix A—PSM Debugger Stored Procedures

Fenced (non-trusted) conRunner stored procedures are invoked by the runner database client 210 thread. They are defined in the db2psmds library to control the debugged session 120 when debugging non-trusted SQL stored procedures. Following are some exemplary stored procedures:
1. to lookup the database connection debugged session identifier:
db2psmds!psmd _GetSessionId(
OUT DOUBLE SessionId,
OUT INTEGER Result);
2. to specify the database connection debugged session identifier:
db2psmds!psmd_SetSessionId(
IN DOUBLE SessionId,
OUT INTEGER Result);
3. to cleanup the database connection debug session resources:
db2psmds!psmd_CleanupSessionId (
IN DOUBLE SessionId,
OUT INTEGER Result);

Unfenced (trusted) conRunner stored procedures are invoked by the runner database client 210 thread. They are defined in the db2psmdr library to control the debug session when debugging non-trusted SQL stored procedures. Following are some exemplary stored procedures:

1. to lookup the database connection debugged session identifier:
db2psmedr!psmd_GetSessionId(
IN DOUBLE SessionId,
OUT INTEGER Result);
2. to specify the database connection debugged session identifier:
db2psmdr!psmd_SetSessionId (
IN DOUBLE SessionId,
OUT INTEGER Result);
3. to cleanup the database connection debug session resources:
db2psmdr!psmd_CleanupSession (
IN DOUBLE SessionId,
OUT INTEGER Result);

Unfenced (trusted) conRunner stored procedures are invoked by the runner database client 204 thread. It is defined in the db2psmdr library to initiate the back-end debug session and communicate with the debugger back-end. Following are some exemplary stored procedures:

1. to initialize the back-end debugger for a specific debugged session identifier;
db2psmdr!psmd_Intialize (
IN DOUBLE SessionId,
OUT INTEGER Result);
2. to terminate and cleanup server resources for a specific debugged session identifier:
db2psmdr!psmd_Terminate (
IN DOUBLE SessionId,
OUT INTEGER Result);
3. to route user commands to the debugger back-end for a specific debugged session identifier:
db2psmdr!psmd_Commands (
IN DOUBLE SessionId,
IN LONG VARCHAR TextStream,
IN LONG VARCHAR FOR BIT DATA BinaryStream,
OUT INTEGER Result);
4. to receive (with time-out in millionth of a second) the debugger back-end status report for a specific debugged session identifier:
db2psmdr!psmd_GetStatus (
IN DOUBLE SessionId,
OUT LONG VARCHAR TextStream,
OUT LONG VARCHAR FOR BIT DATA BinaryStream,
IN INTEGER WaitTimeOut,
OUT INTEGER MoreDataPending,
OUT INTEGER Result);

Fenced (non-trusted) conController stored procedures are invoked prior to and post issuing an SQL stored procedure creation command. They are used to specify the build mode option, namely, to build in debug or release mode, using a Boolean parameter. Following is an exemplary utility stored procedure:
db2udp!compile_for_debug (
IN INTEGER DebugMode);

Appendix B—PSMDCommands XML Document

```
<?xml version="1.0"?>
<!DOCTYPE PSMDCommands>
<!--***********************************************
****************************
*-->
<!--*DEBUGGER COMMANDS:Debugger UI->Router->Session
*-->
<!--***********************************************
****************************
*-->
<PSMDCommands>
<!--***********************************************
****************************
*-->
<!--*GLOSSARY
*-->
<!--***********************************************
****************************
*-->
<!--* rid—Routine integer identifier
*-->
<!--*vid—Variable integer identifier
*-->
<!--bid —Breakpoint integer identifier
>*-->
<!--* boffset—Offset into BLOB data
*-->
<!--*bsize—Size portion of the BLOB data
* -->
<!--***********************************************
****************************
*-->
<!--***********************************************
****************************
*-->
<!--* Command: Specify the Routine IDs
*-->
<!--***********************************************
****************************
*-->
<RoutineIDs>
  <Routine
    schema="xxx"name="xxx"specific="xxx"type="xxx"
    <rid>/Routine>
  <Routine
    schema="xxx"name="xxx"specific="xxx"type="xxx"
    <rid>/Routine>
</RoutineIDs>
<!--***********************************************
****************************
*--<
<!--*Command: Specify the Variable IDs
*-->
<!--***********************************************
****************************
*-->
<VarIDs>
  <Var rid="rid"line="xxx"name="xxx">vid</Var>
  <Var rid="rid"line="xxx"name="xxx">vid</Var>
</VarIDs>
<!--***********************************************
****************************
*-->
<!--* Command: Add line breakpoints (state=1 [enabled] or0)
*-->
<!--***********************************************
****************************
*-->
<AddLineBreakPts>
```

```
        <BreakPt rid="rid"line="xxx"state="x">bid </BreakPt>
        <BreakPt rid="rid"line="xxx"state="x">bid </BreakPt>
</AddLineBreakPts>
<!--********************************************
    ***************************
*-->
<!--* Command: Add line breakpoints (state=1 [enabled]
    or 0)
*-->
<!--********************************************
    ***************************
*-->
<AddVarBreakPts>
    BreakPt rid="rid"vid="vid"state="x">bid</BreakPt>
    BreakPt rid="rid"vid="vid"state="x">bid</BreakPt>
</AddVarbreakPts>
<!--********************************************
    ***************************
*-->
<!--* Command: Remove breakpoints
*-->
<!--********************************************
    ***************************
*-->
<RemoveBreakPts>
    <BreakPt rid="rid">bid</BreakPt>
    <BreakPt rid="rid">bid</BreakPt>
</RemoveBreakPts>
<!--********************************************
    ***************************
*-->
<!--* Command: Enable breakpoints
*-->
<!--********************************************
    ***************************
*-->
<EnableBreakPts>
    <BreakPt rid="rid">bid</BreakPt>
    <BreakPt rid="rid">bid</BreakPt>
</EnableBreakPts>
<!--********************************************
    ***************************
*-->
<!--* Command: Disable breakpoints
*-->
<!--********************************************
    ***************************
*-->
<DisableBreakPts>
    <BreakPt rid="rid">bid</BreakPt>
    <BreakPt rid="rid">bid</BreakPt>
</DisableBreakPts>
<!--********************************************
    ***************************
*-->
<!--*Command: Set text Variable values
*-->
<!--********************************************
    ***************************
*-->
<SetTextVars>
    <Var rid="rid"vid="vid">data</Var>
    <Var rid="rid"vid="vid">data</Var>
</SetTextVars>
<!--********************************************
    ***************************
*-->
<!--* Command: Set large text Variable values (ranges)
*-->
<!--********************************************
    ***************************
*-->
<SetLargeTextVars>
    <Var rid="rid"vid="vid"offset="xxx"size="xxx">data
        </Var>
    <Var rid="rid"vid="vid"offset="xxx"size="xxx">data
        </Var>
</SetLargeTextVars>
<!--********************************************
    ***************************
*-->
<!--* Command: Get large text Variable values (ranges)
*-->
<!--********************************************
    ***************************
*-->
<GetLargeTextVars>
    <Var rid="rid"vid="vid"offset="xxx"size="xxx"/>
    <Var rid="rid"vid="vid"offset="xxx"size="xxx"/>
</GetLargeTextVars>
<!--********************************************
    ***************************
*-->
<!--* Command: Set bit Variable values (data in BLOB)
*-->
<!--********************************************
    ***************************
*-->
<SetBitVars>
    <Var rid="rid"vid="vid"boffset=xxx"bsize="xxx"/>
    <Var rid="rid"vid="vid"boffset=xxx"bsize="xxx"/>
</SetBitVars>
<!--********************************************
    ***************************
*-->
<!--* Command: Set large bit Variable values (range data in
    BLOB)
*-->
<!--********************************************
    ***************************
*-->
<SetLargeBitVars>
    <Var rid="rid"vid="vid"offset="xxx"boffset=xxx"bsize=
        "xxx"/>
    <Var rid="rid"vid="vid"offset="xxx"boffset=xxx"bsize=
        "xxx"/>
</SetLargeBitVars>
<!--********************************************
    ***************************
*-->
<!--* Command: Get large bit Variable values (ranges)
*-->
<!--********************************************
    ***************************
*-->
<GetLargeBitVars>
    <Var rid="rid"vid="vid"offset="xxx"size="xxx"/>
    <Var rid="rid"vid="vid"offset="xxx"size="xxx"/>
</GetLargeBitVars>
<!--********************************************
    ***************************
*-->
<!--* Command: Step into next block/call
*-->
```

```
<!--********************************************
***************************-->
<StepInto/<
<!--********************************************
***************************-->
<!--* Command: Step out of current block/call
*-->
<!--********************************************
***************************-->
<StepOut/<
<!--********************************************
***************************-->
<!--*Command: Step over current line
*-->
<Stepover/<
<!--********************************************
***************************-->
<!--* Command: Return from current call
*-->
<!--********************************************
***************************-->
<StepReturn/<
<!--********************************************
***************************-->
<!--* Command: Run till line is reached
*-->
<!--********************************************
***************************-->
<Run to Line>line</RunToLine>
<!--********************************************
***************************-->
<!--* Command: Run to end or to break-point
*-->
<!--********************************************
***************************-->
<Run/<
<!--********************************************
***************************-->
<!--* Command: Pause current on
*-->
<!--********************************************
***************************-->
<Break/>
<!--********************************************
***************************-->
<!--* Command: Terminate debugging (run to completion
   without debug)
*-->
<!--********************************************
***************************-->
<End>
<!--********************************************
***************************-->
*-->
<!--********************************************
***************************-->
</PSMDCommands>
```

Appendix C—PSMDReport XML Document

```
<?xml version="1.0"?<
<!DOCTYPE PSMDReport>
<PSMDReport>
<!--********************************************
***************************-->
<!--* GLOSSARY
*-->
<!--********************************************
***************************-->
<!--* rid—Routine integer identifier
*-->
<!--* vid—Variable integer identifier
*-->
<!--* rid—Breakpoint integer identifier
*-->
<!--* boffset—Offset into BLOB data
*-->
<!--* bsize—Size portion of the BLOB data
*-->
<!--********************************************
***************************-->
<!--********************************************
***************************-->
*-->
<!--* Message: Add new Routines
*-->
<!--********************************************
***************************-->
<AddRoutines>
   <Routine
      schema="xxx"name="xxx"specific="xxx"type="xxx"
      trid="rid"/>
   <Routine
      schema="xxx"name="xxx"specific="xxx"type="xxx"
      trid="rid"/>
</AddRoutines>
<!--********************************************
***************************-->
<!--* Message: Refresh Call-Stack
*-->
<!--********************************************
***************************-->
<CallStack>
   <Routine line ="xxx">rid</Routine>
   <Routine line ="xxx">rid</Routine>
</CallStack>
<!--********************************************
***************************-->
<!--* Message: Routine updates
*-->
<!--********************************************
***************************-->
```

```
*-->
<Routine Updates rid="rid">
<!--********************************************
**************************-->
    <!--* Message: Text variable (re)definition
*-->
<!--********************************************
**************************-->
    <TextVarDefine
        line="xxx"name="xxx"size="xxx"tvid="vid"/>
<!--********************************************
**************************-->
    <!--* Message: Text variable value update
*-->
<!--********************************************
**************************-->
    <TextVarValue vid="vid">data</TextVarValue>
<!--********************************************
**************************-->
    <!--* Message: Large text variable (re)definition
*-->
<!--********************************************
**************************-->
    <LargeTextVarDefine
        line="xxx"name="xxx"type="xxx"size="xxx"tvid=
        "vid"/>
<!--********************************************
**************************-->
    <!--* Message: Large text variable value update (range)
*-->
<!--********************************************
**************************-->
    <LargeTextVarValuevid="vid"offset="xxx"size
        ="xxx">data</LargeTextVarValue>
<!--********************************************
**************************-->
    <!--* Message: Bit variable (re)definition
*-->
<!--********************************************
**************************-->
    <BitVarDefine
        line="xxx"name="xxx"type="xxx"size="xxx"tvid=
        "vid"/>
<!--********************************************
**************************-->
    <!--* Message: Bit Variable value update (data in BLOB)
*-->
<!--********************************************
**************************-->
    <BitVarValue vid="vid"boffset="xxx"bsize="xxx"/>
<!--********************************************
**************************-->
    <!--* Message: Large bit variable (re)definition
*-->
<!--********************************************
**************************-->
    <LargeBitVarDefine
        line="xxx"name="xxx"type="xxx"size="xxx"tvid=
        "vid"/>
<!--********************************************
**************************-->
    <!--* Message: Large bit Variable value update (range
        data in BLOB)
*-->
<!--********************************************
**************************-->
    <LargeBitVarUpdate
        vid="vid"offset="xxx"boffset="xxx"bsize="xxx"/>
<!--********************************************
**************************-->
    <!--* Message: Variable visibility (scope) update
*-->
<!--********************************************
**************************-->
    <VarVisiblity vid="vid">visible</Var>
</RoutineUpdates>
<!--********************************************
**************************
*-->
<!--* Message: Running at line
*-->
<!--********************************************
**************************
*-->
<AtLine rid="rid"state="xxx"code="xxx">line</AtLine>
<!--********************************************
**************************
*-->
<!--* Message: Stopped at line
*-->
<!--********************************************
**************************
*-->
AtBreak rid="rid"state="xxx"code="xxx">line</AtBreak>
<!--********************************************
**************************
*-->
<!--* Message: Stopped at line due to breakpoint
*-->
<!--********************************************
**************************
*-->
AtBreakPt
    rid="rid"state="xxx"code="xxx"bid="bid">line</At-
    BreakPt>
<!--********************************************
**************************
*-->
<!--* Message: Stopped at line due to exception
*-->
<!--********************************************
**************************
*-->
<AtException   rid="rid"exception="xxx"state="xxx"code
    ="xxx">line</AtException>
<!--********************************************
**************************
*-->
<!--* Message: End of debug run (did not terminate debug-
    ger)
*-->
<!--********************************************
**************************
*-->
<EndRun/>
<!--********************************************
**************************
*-->
<!--* Message: End of debug session (debugger terminated)
*-->
<!--********************************************
**************************
*-->
```

```
<EndSession/>
<!--************************************************
    ****************************
-->
<!--************************************************
    ****************************
-->
</PSMDReport>
```

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer network-based debugging method using XML dataflows from a client for debugging of instructions located in a server having a database management system for retrieving data from a database stored in an electronic storage device coupled to the server, the method comprising the steps of:
   (a) debugging of the server-side instructions performed by a server-side debugger engine; and
   (b) using XML dataflows for providing a database communication interface between a client-side debugger manager and the server-side debugger engine.

2. The method according to claim 1, wherein the debugged instructions being written in Persistent SQL Modules (PSM) language.

3. The method according to claim 1, wherein the debugged instructions being written in PL/SQL language.

4. The method according to claim 1, wherein the debugged instructions being written in TSQL language.

5. The method according to claim 1, wherein the debugged instructions being selected from a group comprising stored procedures, user defined functions and triggers.

6. The method according to claim 1, wherein the step of using XML dataflows includes sending and receiving the XML dataflows defined as command and status report dataflows, wherein each said dataflow having an XML textual data stream and an XML binary data stream.

7. The method according to claim 6, wherein the XML textual data stream including textual data type values, the length and offset of any binary data type value contained in the XML binary data stream.

8. The method according to claim 1, wherein the debugging step providing call-stack tracking, line-by-line execution status reporting, line breakpoints management, variable change breakpoints management, and variable value reporting and modification capabilities.

9. The method according to claim 1, wherein the method being used in a distributed computing environment wherein at least two computer systems being connected by a network, and the computer systems having computers of different type.

10. The method according to claim 9, wherein the XML dataflows being used for managing server network resources.

11. The method according to claim 1, wherein only nonproprietary database connections being required between the server and the client.

12. The method according to claim 1, wherein the step of using XML dataflows comprising the following steps:
   sending and receiving the XML dataflows defined as command and status report dataflows, wherein each said dataflow having an XML textual data stream and an XML binary data stream; and
   using stored procedures at the server as a database communication interface between the debugger manager and the server-side debugger engine.

13. The method according to claim 1, wherein the database communication interface enabling the server-side debugger manager to command and monitor debugging operations of the server-side SQL instructions performed by the server-side debugger engine.

14. A debugger system within a computer system network, using XML dataflows from a client for debugging of instructions located in a server having a database management system for retrieving data from a database stored in an electronic storage device coupled to the server, the system comprising:
   a server-side debugger engine for debugging of the server-side instructions; and
   a database communication interface between a client-side debugger manager and the server-side debugger engine using XML dataflows.

15. The system according to claim 14, wherein the debugged instructions being written in Persistent SQL Modules (PSM) language.

16. The system according to claim 14, wherein the debugged instructions being written in PL/SQL language.

17. The system according to claim 14, wherein the debugged instructions being written in TSQL language.

18. The system according to claim 14, wherein the debugged instructions being selected from a group comprising stored procedures, user defined ftinctions and triggers.

19. The system according to claim 14, wherein said XML dataflows comprising XML command dataflows and XML status report dataflows, each having an XML textual data stream and an XML binary data stream.

20. The system according to claim 19, wherein the XML textual data stream including textual data type values, the length and offset of any binary data type value contained in the XML binary data stream.

21. The system according to claim 14, wherein the server-side debugger system providing call-stack tracking, line-by-line execution status reporting, line breakpoints management, variable change breakpoints management, and variable value reporting and modification capabilities.

22. The system according to claim 14, wherein the system being used in a distributed computing environment wherein at least two computer systems being connected by a network, and the computer systems having computers of different type.

23. The system according to claim 22, wherein the XML dataflows being used for managing server network resources.

24. The system according to claim 14, wherein only nonproprietary database connections being required between the server and the client.

25. The system according to claim 14, further comprising:
   means for sending and receiving the XML dataflows defined as command and status report dataflows, wherein each said dataflow having an XML textual data stream and an XML binary data stream; and
   means for using stored procedures at the server as a database communication interface between the server-side debugger manager and the server-side debugger engine.

26. The system according to claim 14, wherein the database communication interface enabling the server-side debugger manager to command and monitor debugging operations of the server-side SQL instructions performed by the server-side debugger engine.

27. A program storage device readable by a computer tangibly embodying a program of instructions executable by the computer to perform a computer network-based debugging method using XML dataflows from a client for debugging of instructions located in a server having a database management system for retrieving data from a database stored in an electronic storage device coupled to the server, the method comprising the steps of:
   (a) debugging of the server-side instructions performed by a server-side debugger engine; and
   (b) using XML dataflows for providing a database communication interface between a client-side debugger manager and the server-side debugger engine.

28. The method according to claim 27, wherein the debugged instructions being written in Persistent SQL Modules (PSM) language.

29. The method according to claim 27, wherein the debugged instructions being written in PL/SQL language.

30. The method according to claim 27, wherein the debugged instructions being written in TSQL language.

31. The method according to claim 27, wherein the debugged instructions being selected from a group comprising stored procedures, user defined functions and triggers.

32. The method according to claim 27, wherein the step of using XML dataflows includes sending and receiving the XML dataflows defined as command and status report dataflows, wherein each said dataflow having an XML textual data stream and an XML binary data stream.

33. The method according to claim 32, wherein the XML textual data stream including textual data type values, the length and offset of any binary data type value contained in the XML binary data stream.

34. The method according to claim 27, wherein the debugging step providing call-stack tracking, line-by-line execution status reporting, line breakpoints management, variable change breakpoints management, and variable value reporting and modification capabilities.

35. The method according to claim 27, wherein the method being used in a distributed computing environment wherein at least two computer systems being connected by a network, and the computer systems having computers of different type.

36. The method according to claim 35, wherein the XML dataflows being used for managing server network resources.

37. The method according to claim 27, wherein only nonproprietary database connections being required between the server and the client.

38. The method according to claim 27, wherein the step of using XML dataflows comprising the following steps:
   sending and receiving the XML dataflows defined as command and status report dataflows, wherein each said dataflow having an XML textual data stream and an XML binary data stream; and
   using stored procedures at the server as a database communication interface between the debugger manager and the server-side debugger engine.

39. The method according to claim 27, wherein the database communication interface enabling the server-side debugger manager to command and monitor debugging operations of the server-side SQL instructions performed by the server-side debugger engine.

* * * * *